US012223880B2

(12) United States Patent
Ishii et al.

(10) Patent No.: US 12,223,880 B2
(45) Date of Patent: *Feb. 11, 2025

(54) CONTROL DEVICE, DISPLAY APPARATUS, AND CONTROL METHOD

(71) Applicant: JOLED INC., Tokyo (JP)

(72) Inventors: Hiroaki Ishii, Tokyo (JP); Toshiyuki Kato, Tokyo (JP)

(73) Assignee: JDI DESIGN AND DEVELOPMENT G.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,247

(22) Filed: Oct. 14, 2022

(65) Prior Publication Data

US 2023/0130414 A1 Apr. 27, 2023

(30) Foreign Application Priority Data

Oct. 21, 2021 (JP) ................................ 2021-172137

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0819* (2013.01); *G09G 2300/0852* (2013.01); *G09G 2310/08* (2013.01); *G09G 2320/0247* (2013.01); *G09G 2330/021* (2013.01); *G09G 2340/16* (2013.01)

(58) Field of Classification Search
CPC ............... G09G 3/2096; G09G 3/3233; G09G 2300/0819; G09G 2300/0852; G09G 2310/08; G09G 2320/0247; G09G 2330/021; G09G 2340/16
See application file for complete search history.

(56) References Cited

U.S. PATENT DOCUMENTS 11,436,988 B2 * 9/2022 Ishii ..................... G09G 3/2025
11,705,077 B2 * 7/2023 Ishii ..................... G09G 3/2003
345/690

(Continued)

FOREIGN PATENT DOCUMENTS

JP 2019-15794 1/2019
JP 2021-76828 5/2021

*Primary Examiner* — Amare Mengistu
*Assistant Examiner* — Jennifer L Zubajlo
(74) *Attorney, Agent, or Firm* — Greenblum and Bernstein, P.L.C.

(57) ABSTRACT

A control device is for use in a case where frame periods, each being a period in which one image continues to be displayed, vary in length within a given range or temporarily become stable in length on a frame-by-frame basis, and accurate lengths of the frame periods are not known beforehand. The control device changes a total number of subframe periods to reconfigure the frame period with n subframe periods, where n is an integer of two or more, regardless of the frame period input, and causes the display of the image. The control device includes a signal processor that outputs an output video signal according to a first input video signal on a subframe-period-by-subframe-period basis; and a controller that supplies the output video signal output from the signal processor and a control signal for controlling an operation of the display panel to the display panel.

15 Claims, 12 Drawing Sheets

(56) References Cited

U.S. PATENT DOCUMENTS

| | | | | |
|---|---|---|---|---|
| 2008/0158212 | A1* | 7/2008 | Maruyama | G09G 3/2025 345/208 |
| 2010/0214328 | A1* | 8/2010 | Hara | G09G 3/2025 345/690 |
| 2014/0327664 | A1* | 11/2014 | Kanda | G09G 3/3233 345/212 |
| 2015/0124124 | A1* | 5/2015 | Maeyama | H04N 23/743 348/235 |
| 2015/0221261 | A1* | 8/2015 | Asai | G09G 5/395 345/534 |
| 2015/0235343 | A1* | 8/2015 | Asai | G09G 5/001 345/534 |
| 2017/0169801 | A1* | 6/2017 | Satoh | G06T 1/60 |
| 2018/0350304 | A1* | 12/2018 | Ishii | G09G 3/2022 |
| 2019/0014292 | A1* | 1/2019 | Ishii | H10K 59/131 |
| 2021/0142742 | A1* | 5/2021 | Ishii | G09G 3/3233 |
| 2022/0375419 | A1* | 11/2022 | Ishii | G09G 3/3258 |
| 2023/0110329 | A1* | 4/2023 | Ishii | G09G 3/2018 345/204 |

* cited by examiner

CONTROL DEVICE, DISPLAY APPARATUS, AND CONTROL METHOD

CROSS REFERENCE TO RELATED APPLICATION

The present application is based on and claims priority of Japanese Patent Application No. 2021-172137 filed on Oct. 21, 2021. The entire disclosure of the above-identified application, including the specification, drawings and claims is incorporated herein by reference in its entirety.

FIELD

The present disclosure relates to a control device, a display apparatus, and a control method, and particularly to a control device, a display apparatus, and a control method for controlling the display luminance of a display.

BACKGROUND

Techniques of reducing the flickering observed on a display apparatus have been studied. For example, studied are techniques of changing the number of subframes constituting one frame period in accordance with the duty cycle set in accordance with luminance information so that the duty cycle in each subframe is the same as the duty cycle in one frame period. Accordingly, even with a change in the light emission period by adjusting the luminance or other factors, less flickering occurs on a display screen.

In recent years, a video processing device called a "graphics processing unit (GPU)" has presented videos on a display of a personal computer, a mobile device, or any other suitable device. The performance of the GPU has determined the display speed of the display. In other words, in recent years, a frame period (i.e., the frame rate) has varied depending on the processing of the GPU.

In view of this, patent literature (PTL) 1 discloses a control device, for example, that causes less flickering, even with a variation in a frame period. Specifically, PTL 1 discloses a control device, for example, that changes the number of subframes to reconfigure the frame period with n subframes, where n is an integer of two or more, regardless of the frame period input so as to display an image.

CITATION LIST

Patent Literature

PTL 1: Japanese Unexamined Patent Application Publication No. 2021-076828

SUMMARY

Technical Problem

However, the technique in PTL 1 requires a memory for converting the frame rate into a subframe rate in a panel timing controller (TCON), which causes the problem of power consumption.

To address the problem, the present disclosure provides a control device, a display apparatus, and a control method with less power consumption.

Solutions to Problem

A control device according an aspect of the present disclosure is for use in a case where frame periods, each being a period in which one image continues to be displayed, vary in length within a given range or temporarily become stable in length on a frame-by-frame basis, and accurate lengths of the frame periods are not known beforehand. The control device changes a total number of subframe periods to reconfigure the frame period with n subframe periods, where n is an integer of two or more, regardless of the frame period input, and causing the display of the image. The control device includes: a signal processor that outputs an output video signal according to a first input video signal on a subframe-period-by-subframe-period basis; and a controller that supplies the output video signal output from the signal processor and a control signal for controlling an operation of the display panel to the display panel.

A display apparatus according an aspect of the present disclosure includes: the control device described above; and the display panel including a gate driver circuit that receives the control signal from the control device, and a source driver circuit that receives the output video signal from the control device.

A control method according an aspect of the present disclosure is for use in a case where frame periods, each being a period in which one image continues to be displayed, vary in length within a given range or temporarily become stable in length on a frame-by-frame basis, and accurate lengths of the frame periods are not known beforehand. The control method includes: changing a total number of subframe periods to reconfigure the frame period with n subframe periods, where n is an integer of two or more, regardless of the frame period input, and displaying the image; outputting an output video signal according to an input video signal on a subframe-period-by-subframe-period basis; and supplying the output video signal and a control signal for controlling an operation of the display panel to the display panel.

Advantageous Effects

According to the aspects of the present disclosure, a control device, for example, is achieved with less power consumption.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENT

Figure 1:
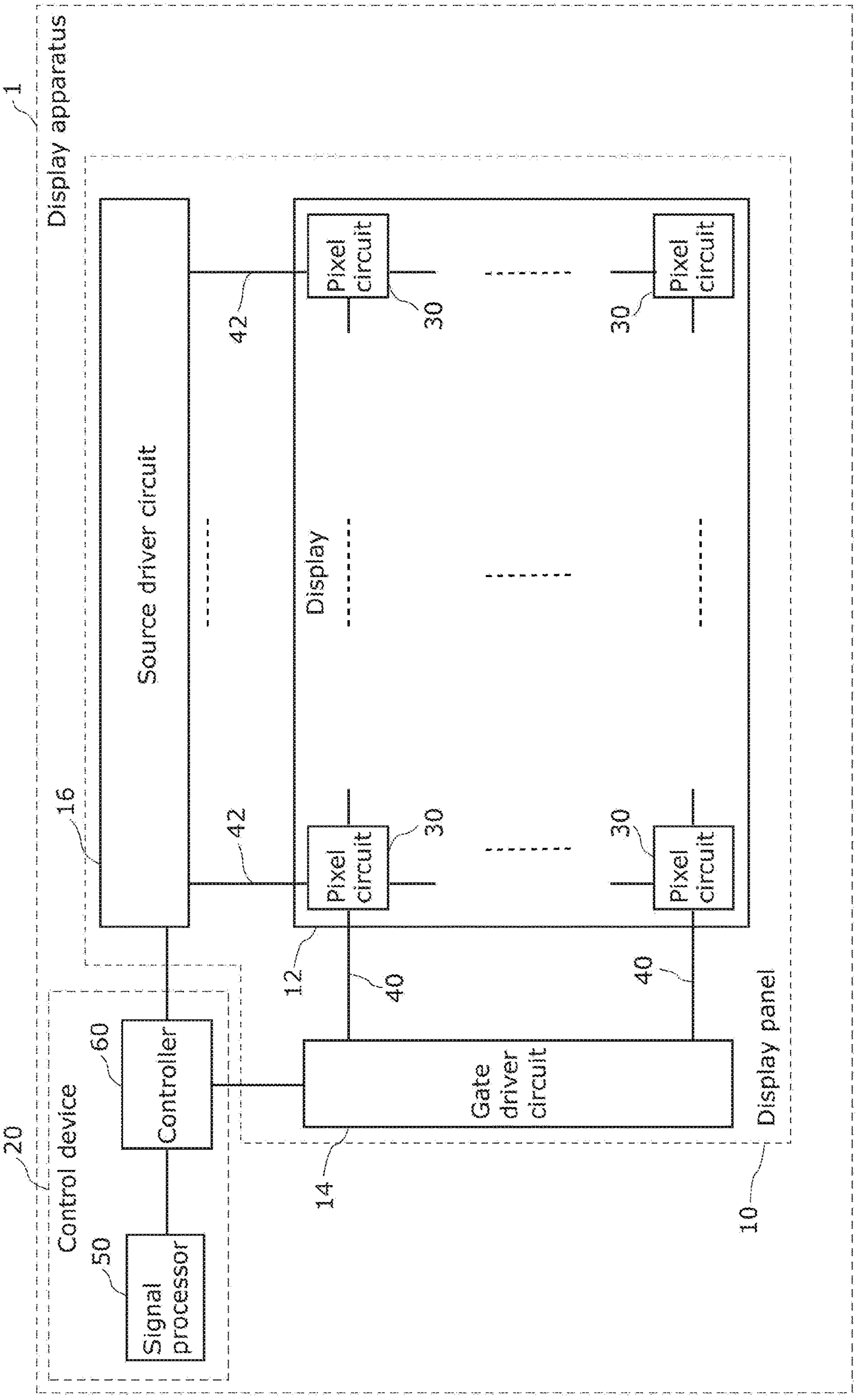
FIG. 1 is a schematic diagram showing an example configuration of a display apparatus according to an embodiment.

Now, an embodiment will be described in detail with reference to the drawings.

The embodiment described below is a comprehensive or specific example. The numerical values, shapes, constituent elements, the arrangement and connection of the constituent elements, steps, step orders etc. shown in the following embodiment are mere examples, and are not intended to limit the scope of the present disclosure. The terms, such as the "same" representing the relationship between elements, numerical values and numerical value ranges not only have exact meaning but include substantially equivalent ranges with differences of about several percent (e.g., about 5%). Among the constituent elements in the following embodiment, those not recited in the independent claims will be described as optional.

The drawings are schematic representations and not necessarily drawn strictly to scale. For example, the scales are thus not necessarily the same in the figures. The same reference signs represent substantially the same configurations in the drawings and redundant description will be omitted or simplified.

Embodiment

Now, a control device, for example, according to this embodiment will be described with reference to FIGS. 1 to 10. An example will be described in this embodiment where a display apparatus is an organic electroluminescence (EL) element.

1. Configuration of Display Apparatus

First, a configuration of the display apparatus including a control device according to an aspect of the present disclosure will be described with reference to FIG. 1. FIG. 1 is a schematic diagram showing an example configuration of display apparatus 1 according to this embodiment.

As shown in FIG. 1, display apparatus 1 includes display panel 10 and control device 20. Display apparatus 1 is driven by a progressive drive system of an organic EL light emitting panel, for example.

1-1. Configuration of Display Panel

Display panel 10 includes display 12 with a plurality of pixel circuits 30, and gate driver circuit 14 and source driver circuit 16 as peripheral circuits of display 12. Note that display 12, gate driver circuit 14, source driver circuit 16, scan lines 40, and signal lines 42 are mounted on a panel board (not shown) made of glass or a resin, such as acrylic, for example.

Display 12 displays videos based on video signals (video signals R, G, and B) input from outside to display apparatus 1. As shown in FIG. 1, display 12 includes the plurality of pixel circuits 30 arranged in a matrix including scan lines 40 as rows and signal lines 42 as columns. On display 12, initialization operations, writing operations, and light emitting operations are executed sequentially on a row-by-row basis of the plurality of pixel circuits 30.

The plurality of pixel circuits 30 are included in display panel 10 and arranged in a matrix. More specifically, the plurality of pixel circuits 30 are each placed at the intersection of one of scan lines 40 and one of signal lines 42. Details will be described later.

Scan lines 40 are provided as rows of the plurality of pixel circuits 30. Each scan line 40 has one end connected to one of pixel circuits 30 and the other end connected to gate driver circuit 14.

Signal lines 42 are provided as columns of the plurality of pixel circuits 30. Each signal line 42 has one end connected to one of pixel circuits 30 and the other end connected to source driver circuit 16.

Gate driver circuit 14 is also called as a "scan line driver circuit" and is a shift register, for example. Gate driver circuit 14 is connected to scan lines 40 and outputs gate control signals to scan lines 40 to control on and off of the transistors of pixel circuits 30. In this embodiment, gate driver circuit 14 outputs, as the gate control signals for controlling on and off of the transistors of pixel circuits 30, for example, control signal WS, control signal REF, control signal INI, and extinction signal EN to the gates (i.e., the gate electrodes) of the transistors of pixel circuits 30. Control signal WS, control signal REF, control signal INI, and extinction signal EN are examples of the "control signal".

Source driver circuit 16 is also called a "signal line driver circuit". Source driver circuit 16 is connected to signal lines 42 and outputs, to signal lines 42, the video signals supplied from control device 20 on a frame-by-frame basis, thereby supplying the video signals to pixel circuits 30. Source driver circuit 16 writes, as current values or voltage values, luminance information according to the video signals through signal lines 42 to pixel circuits 30. Note that the video signals input to source driver circuit 16 are digital serial data (video signals R, G, and B) in three primary colors RGB, for example. The video signals R, G, and B input to source driver circuit 16 are converted inside source driver circuit 16 into parallel data on a row-by-row basis. The parallel data on a row-by-row basis is converted inside source driver circuit 16 into analog data on a row-by-row basis and output as video signals to signal lines 42.

1-2. Configuration of Pixel Circuit

The plurality of pixel circuits 30 are arranged in N rows and M columns, for example. N and M vary depending on the size and resolution of the display screen. For example, if pixel circuits 30 corresponding to three primary colors RGB are adjacent to each other in rows at a resolution called "high definition (HD)", N is at least 1080 rows and M is at least 1920×3 columns. In this embodiment, each pixel circuit 30 includes an organic EL element as a light emitting element.

Figure 2:
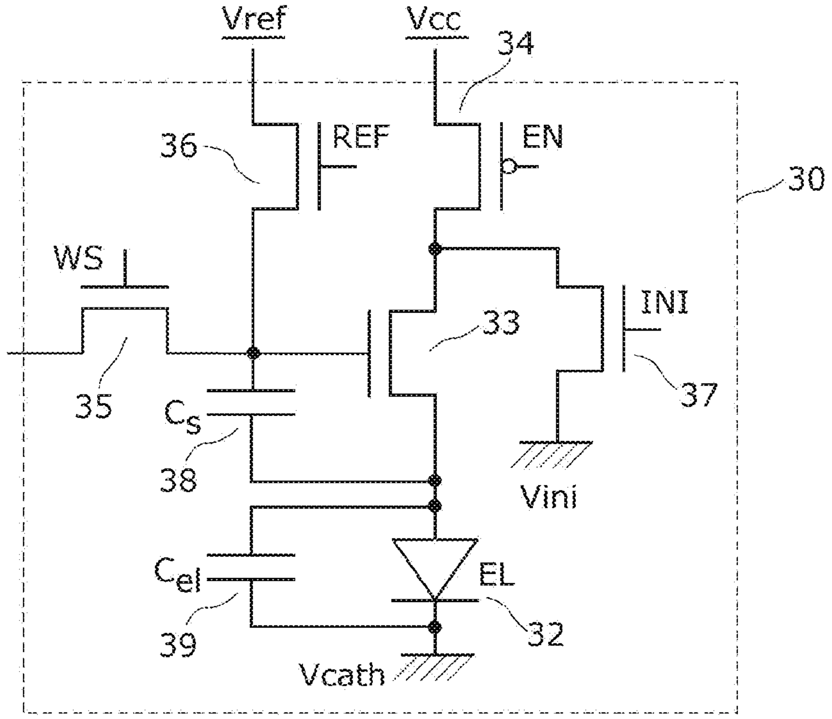
FIG. 2 is a circuit diagram schematically showing a configuration of a pixel circuit according to the embodiment.

The configuration of each pixel circuit 30 will be further described with reference to FIG. 2. FIG. 2 is a circuit diagram schematically showing the configuration of pixel circuit 30 according to this embodiment.

As shown in FIG. 2, pixel circuit 30 includes light emitting element 32, driver transistor 33, switching transistors 34, 36, and 37, selection transistor 35, and pixel capacitor 38. Note that pixel capacitor 38 is also referred to as Cs in FIG. 2.

Light emitting element 32 includes a cathode connected to power source (i.e., negative power source line) Vcath and an anode connected to the source of driver transistor 33. Once a current supplied from driver transistor 33 and corresponding to the signal voltage of a video signal flows, light emitting element 32 emits light at a luminance according to the signal voltage. Light emitting element 32 is an organic EL element, such as an organic light emitting diode (OLED). For example, each of pixel circuits (i.e., pixels) 30 constituting display panel 10, which displays an image, includes light emitting element 32 that includes organic EL element and emits light by a current drive. Note that light emitting element 32 is not limited to the organic EL element but may be a self-luminous element, such as an inorganic EL element or a quantum-dot light emitting diode (QLED). Light emitting element 32 is not necessarily a self-luminous element as long as being controlled by a current drive.

Driver transistor 33 includes a gate connected to one of electrodes or any other suitable elements of pixel capacitor 38, a drain connected to the source of switching transistor 34, and a source connected to the anode of light emitting element 32. In FIG. 2, the source is further connected to the other of the electrodes or any other suitable elements of pixel capacitor 38. Driver transistor 33 converts a signal voltage applied between the gate and the source into a current (also referred to as a "drain-source current") corresponding to the signal voltage. When being turned on, driver transistor 33 supplies the drain-source current to light emitting element 32 to cause light emitting element 32 to emit light. Driver transistor 33 is an n-type thin film transistor (n-type TFT), for example.

Switching transistor 34 includes a gate connected to corresponding scan line 40 and a source and a drain, one of which is connected to power source Vcc and the other of which is connected to the drain of driver transistor 33. Switching transistor 34 is turned on and off in accordance with extinction signal EN supplied from scan line 40. When being turned on, switching transistor 34 connects driver transistor 33 to power source Vcc to cause the supply of the drain-source current of driver transistor 33 to light emitting element 32. In each pixel circuit 30 according to this embodiment, switching transistor 34 is turned on and switching transistor 37 is turned off, whereby driver transistor 33 is connected to power source Vcc and the drain-source current of driver transistor 33 is supplied to light emitting element 32. Switching transistor 34 is a p-type thin film transistor (p-type TFT), for example.

Selection transistor 35 includes a gate connected to corresponding scan line 40 and a source and a drain, one of which is connected to corresponding signal line 42 and the other of which is connected to one of electrodes of pixel capacitor 38. Selection transistor 35 is turned on and off in accordance with control signal WS supplied from scan line 40. When being turned on, selection transistor 35 applies the signal voltage of a video signal supplied from signal line 42 to the electrode of pixel capacitor 38 and causes pixel capacitor 38 to store a charge corresponding to the signal voltage. Selection transistor 35 is an n-type thin film transistor (n-type TFT), for example.

Switching transistor 36 includes a gate connected to corresponding scan line 40 and a source and a drain, one of which is connected to power source Vref and the other of which is one of the electrodes or any other suitable elements of pixel capacitor 38. Switching transistor 36 is turned on and off in accordance with control signal REF supplied from scan line 40. When being turned on, switching transistor 36 sets the electrode of pixel capacitor 38 at a voltage (i.e., a reference voltage) of power source Vref. Switching transistor 36 is an n-type thin film transistor (n-type TFT), for example.

Switching transistor 37 includes a gate connected to scan line 40 and a source and a drain, one of which is connected to the source of switching transistor 34 and the drain of driver transistor 33 and the other of which is connected to power source Vini. Switching transistor 37 is turned on and off in accordance with control signal INI supplied from scan line 40. When being turned on when driver transistor 33 is on and switching transistor 34 is on but disconnected from power source Vcc, switching transistor 37 sets the anode of light emitting element 32 at a voltage (i.e., a reference voltage) of power source Vini. Switching transistor 37 is an n-type thin film transistor (n-type TFT), for example.

Pixel capacitor 38 includes electrodes, one of which is connected to the gate of driver transistor 33, the source of selection transistor 35, and the source of switching transistor 36 and the other of which is connected to the source of driver transistor 33. Pixel capacitor 38 stores a charge corresponding to a signal voltage supplied from signal line 42. Pixel capacitor 38 stably holds the voltage between the gate and source electrodes of driver transistor 33, for example, after selection transistor 35 and switching transistor 36 have been turned off. In this manner, pixel capacitor 38 applies a voltage between the gate and source of driver transistor 33 in accordance with the signal potential caused by the stored charge, when selection transistor 35 and switching transistor 36 are off.

EL capacitor 39 is a parasitic capacitor inside an EL element. After this capacitor has been charged to raise the voltage between the electrodes, a current flows toward the EL element so that the EL element starts emitting light.

Note that the conductivity types of driver transistor 33, selection transistor 35, switching transistor 36, and switching transistor 37 are not limited to what have been described above. N- and p-type TFTs may be mixed as appropriate. The conductivity type of switching transistor 34 is also not limited to what has been described above. Switching transistor 34 may be an n-type TFT. The transistors are not necessarily polysilicon TFTs and may be amorphous silicon TFTs.

1-3. Configuration of Control Device

Figure 3:
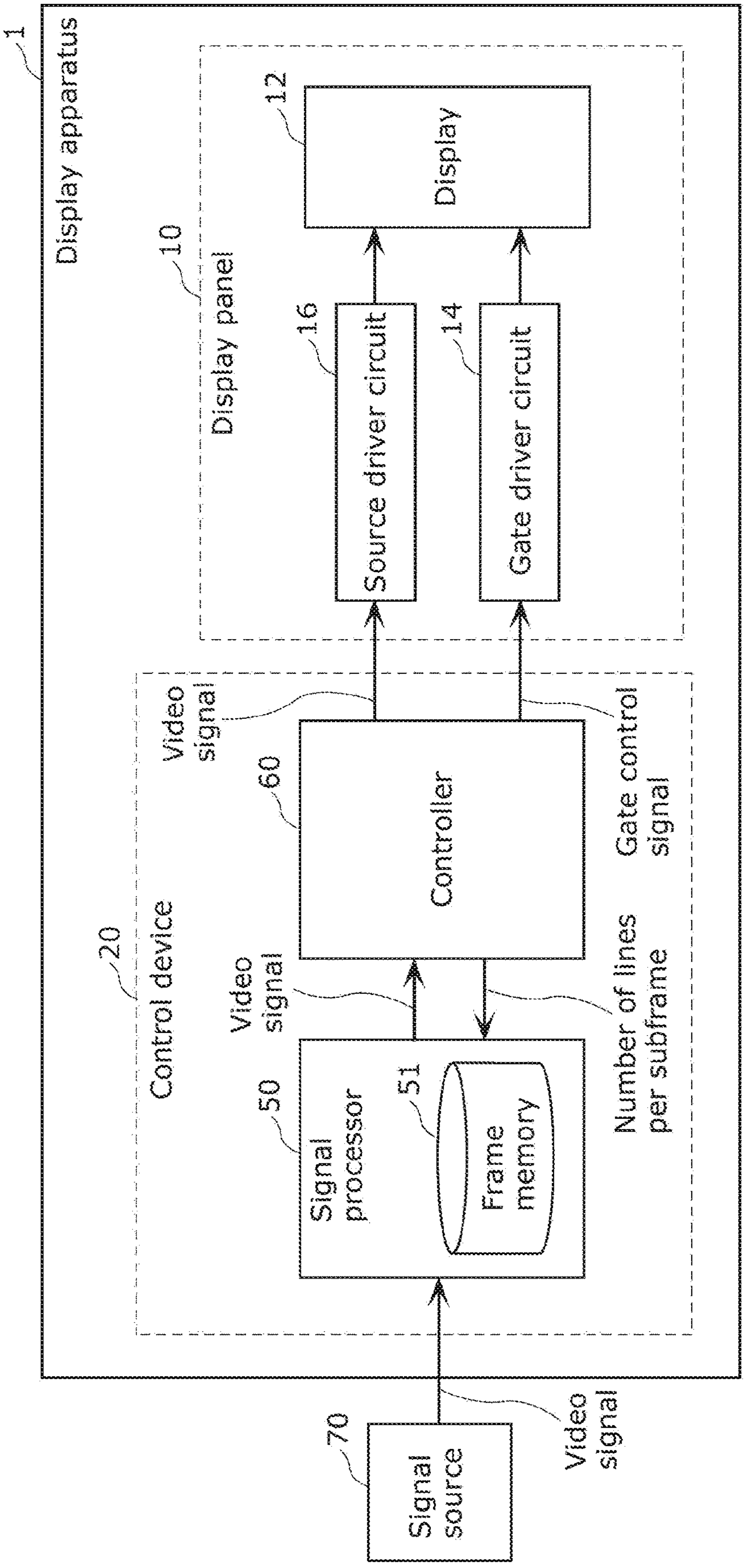
FIG. 3 is a block diagram showing an example functional configuration of the display apparatus according to the embodiment.

Control device 20 according an aspect of the present disclosure is for display panel 10 when a frame period of continuing display of an image varies within a certain range or becomes temporarily stable in each frame but is not exactly known in advance. Control device 20 performs control for displaying an image by reconfiguring the display frame period with subframes (i.e., subframe periods) with a fixed length regardless of the frame period input. In this embodiment, the subframe period (i.e., the subframe length) is fixed regardless of the input frame period (i.e., the input frame length), control device 20 performs control of changing the number of subframes in accordance with the input frame length. Now, control device 20 according to this embodiment as an aspect of the present disclosure will be further described with reference to FIG. 3. FIG. 3 is a block diagram showing an example functional configuration of display apparatus 1 according to the embodiment.

As shown in FIGS. 1 and 3, control device 20 includes signal processor 50 and controller 60. Note that control device 20 is placed outside display panel 10. Control device 20 is formed on a circuit board (not shown) of an external system, for example. Control device 20 generates various control signals based on vertical synchronizing signal VS, horizontal synchronizing signal HS, and video period signal DE supplied from the outside.

Signal processor 50 functions as a scaler, for example, and outputs, to controller 60, a video signal supplied from signal source 70 outside display apparatus 1 at each predetermined time. Signal processor 50 stores the video signal supplied from signal source 70 in frame memory 51, reads a video signal from frame memory 51 at each predetermined time, and outputs the read video signal to controller 60. The reading and writing of video signals in and from frame memory 51 will be described later (see FIG. 7). Note that signal source 70 is, for example, a terminal device, such as a personal computer or a game console, but not limited thereto.

The predetermined time is set based on one frame period. Specifically, the predetermined time is set to subframe periods corresponding to one frame period. In this embodiment, the predetermined time is on a subframe-period-by-subframe-period basis. That is, signal processor 50 reads a video signal from frame memory 51 and outputs the read video signal to controller 60 on a subframe-period-by-subframe-period basis. The subframe period is defined based on the number of lines as notified of in advance. Each frame is expressed by n times this subframe.

If one frame period has 144 Hz, the subframe period may have 720 Hz (1.39 ms), for example. In this case, it can also be said that each frame is expressed as five times of the subframe. Note that n is not limited to five. The subframe period may be set based on, for example, the shortest frame period (i.e., one frame period) among the frame periods variable in the GPU mounted on display apparatus 1.

Note that each subframe period may be set in advance and stored in a memory of signal processor 50. That is, signal processor 50 may determine the subframe period.

Signal processor 50 may obtain information on the number of lines (i.e., the number of display lines) per subframe from controller 60 and generate a video signal to be output to controller 60 based on the obtained information. Signal processor 50 may generate a video signal (i.e., an example of the "output video signal") and output the generated video signal to controller 60. The video signal is obtained by, for example, performing predetermined signal processing according to the number of lines on a video signal (i.e., a video signal obtained from signal source 70 and an example of the "first input video signal") stored in frame memory 51. Note that the first input video signal and the output video signal may be the same. An example will be described below where the first input video signal and the output video signal are the same. Both the signals may also be simply referred to as a "video signal".

The number of lines per subframe is variable by, for example, a user changing the settings (e.g., settings such as resolution or a display area on the display screen) of display 12.

In this manner, signal processor 50 may obtain information indicating the number of lines in a subframe period of display panel 10, which displays an image, from controller 60 and generate a video signal to be output to controller 60 based on the information. Signal processor 50 generates a video signal according to the information, for example, and outputs the generated video signal to controller 60.

Note that the number of lines in each subframe period may be set in advance and stored in a memory. Signal processor 50 may then read the information from the memory and generate a video signal to be output to controller 60 based on the read information.

Frame memory 51 is a storage device that stores video signals. Frame memory 51 is of a "1W1R type" with one write port (W) and one read port (R). That is, frame memory 51 can perform write and read operations at the same time. Frame memory 51 is not particularly limited as long as having a typical storage function and may be a semiconductor memory. Frame memory 51 is an example of the "memory".

Frame memory 51 has a storage capacity for storing video signals for at least one screen (i.e., one frame). In this embodiment, frame memory 51 has a storage capacity according to the predetermined time in addition to the storage capacity for one screen. The storage capacity of frame memory 51 will be described later.

Controller 60 functions as a timing controller (TCON), for example, and controls the overall operation of display apparatus 1. Controller 60 supplies a video signal and a control signal (an example of the "control signal" for controlling the operation of display panel 10) to display panel 10. The video signal is output from signal processor 50. The control signal is for controlling gate driver circuit 14 and source driver circuit 16. Specifically, controller 60 generates a gate control signal and outputs the generated gate control signal to gate driver circuit 14. The gate control signal is for controlling gate driver circuit 14 to display a video signal on display 12 at a desired time. Controller 60 outputs, to gate driver circuit 14, a gate control signal generated based on vertical synchronizing signal VS, horizontal synchronizing signal HS, and video period signal DE, for example. In this embodiment, controller 60 detects receipt of vertical synchronizing signal VS or video period signal DE.

In this embodiment, controller 60 generates a gate control signal causing the execution of a plurality of subframe periods of alternating light emission and extinction periods at a certain time interval. Once signal processor 50 detects a signal indicating the start of a frame period, controller 60 generates a gate control signal causing the execution of an initialization period in the extinction period of the subframe period next to the subframe period being executed at the time of detection. At other times, that is, unless a signal indicating the start of a frame period is detected, controller 60 generates a gate control signal causing the repetition of subframe periods of alternating light emission and extinction periods at a certain time interval. In addition, controller 60 supplies digital serial data indicated by a video signal to source driver circuit 16.

Controller 60 includes no frame memory for temporarily holding the video signals obtained from signal processor 50. For example, in control device 20, only signal processor 50 out of signal processor 50 and controller 60 includes a frame memory for storing video signals. That is, controller 60 performs no control of the time of supplying the digital serial data indicated by the video signals R, G, and B to source driver circuit 16 (i.e., no control of converting the frame rate). In the present disclosure, the times are controlled by signal processor 50. In other words, controller 60 performs no processing of outputting any video signal with a delay.

While the communication interface protocol between signal processor 50 and controller 60 is not particularly limited. For example, embedded DisplayPort (eDP) may be employed. Signal processor 50 and controller 60 may be connected communicatively via a serial peripheral interface (SPI) bus.

Signal processor 50 and controller 60 may be integrated circuit (IC) chips different from each other. Signal processor 50 and controller 60 may be IC chips different from each other but mounted on the same circuit board, for example.

As described above, for example, control device 20 writes a video signal in a frame memory (e.g., frame memory 51) inside control device 20 only once and reads the video signal from the frame memory at least once. In other words, control device 20 writes a video signal in a frame memory (e.g., frame memory 51) only once upon supply of the video signal from signal source 70. Control device 20 reads a video signal from the frame memory at least once and outputs the read video signal to display panel 10.

Figure 4:
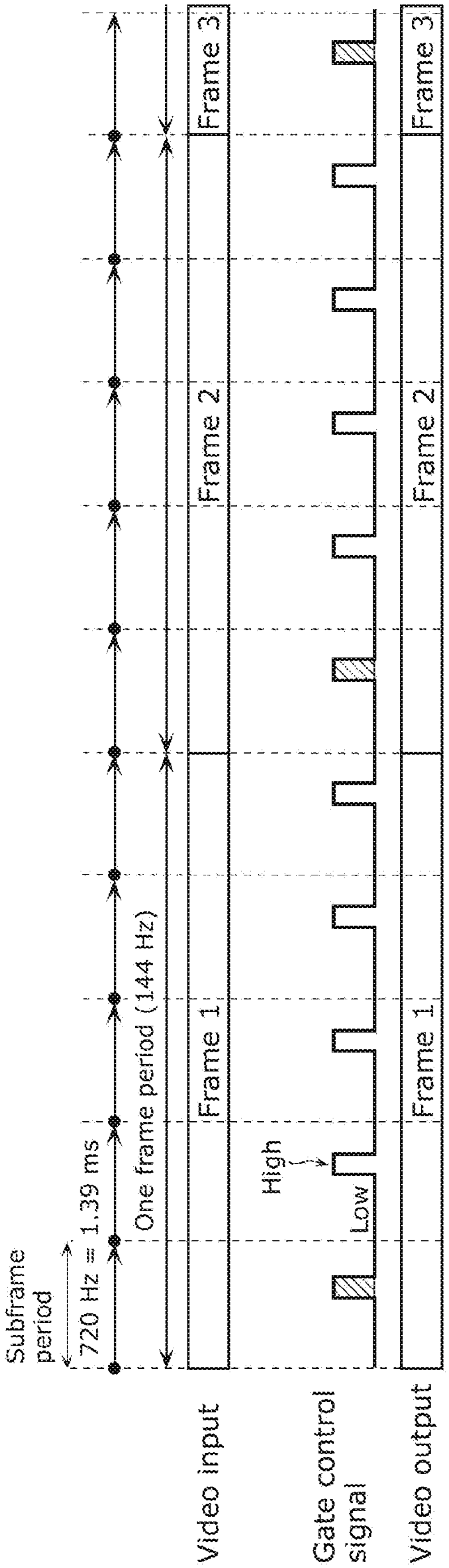
FIG. 4 shows an overview of duty control by a controller according to the embodiment.

Here, FIG. 4 shows an overview of duty control by controller 60 according to this embodiment. Note that the gate control signal shown in FIG. 4 is input to the gate of switching transistor 34.

Controller 60 detects a signal indicating the start of a frame period. The signal indicating the start of a frame period may be vertical synchronizing signal VS or video period signal DE. While being described below as variable, the frame period may be fixed.

Controller 60 generates a gate control signal for causing gate driver circuit 14 to perform the duty control shown in FIG. 4. More specifically, upon detection of the signal, controller 60 generates the following gate control signal. The gate control signal causes sequential start of n subframe periods, where n is an integer of two or more, constituting a frame period from the first subframe period in a predetermined time after the detection of the signal. This gate control signal sets all the subframe periods to the same predetermined length and the same predetermined duty cycle, which is the ratio of the light emission period to the light emission period and the extinction period.

Note that the subframe periods not necessarily have the same predetermined length but may have the same length (not only completely the same length but also includes the range deemed to be the "same length" with certain errors). Controller 60 may set n subframe periods to the same predetermined length. Similarly, the duty cycle, which is the ratio of the light emission period to the light emission period and the extinction period, is not necessarily the same predetermined ratio but may be the same ratio (not only completely the same ratio but also includes the range deemed to be the "same ratio" with certain errors).

Controller 60 generates a gate control signal for causing the extinction period (e.g., the hatched period of the gate control signal shown in FIG. 4) of each first subframe period of n subframe periods to include an initialization period for initializing the plurality of pixel circuits 30.

The predetermined time is as follows, if a signal indicating the start of the frame period next to a frame period is detected while the last subframe period of n subframe periods is executed. The predetermined time is from the time of detecting the signal in the last subframe period to the end of the last subframe period.

The example shown in FIG. 4 will be described. Controller 60 generates a gate control signal for causing one frame period to include a plurality of subframe periods with the same length and setting the subframe periods to have the same duty cycle, that is, to have extinction periods with the same length. It can be also said that controller 60 causes the duty cycles, each of which is the ratio of the light emission period to each subframe period, to be the same predetermined period.

However, controller 60 generates a gate control signal for causing the extinction period of the first subframe period constituting one frame period to include an initialization period. An example is shown in FIG. 4 where one frame period has 144 Hz, each subframe period has 720 Hz (1.39 ms), and one frame period includes five subframe period. In FIG. 4, the gate control signal is High in the extinction periods, among which each hatched period corresponds to an extinction period including the initialization period. Being a p-type transistor, switching transistor 34 is off when the gate control signal is High, and on when the gate control signal is Low.

Figure 5:
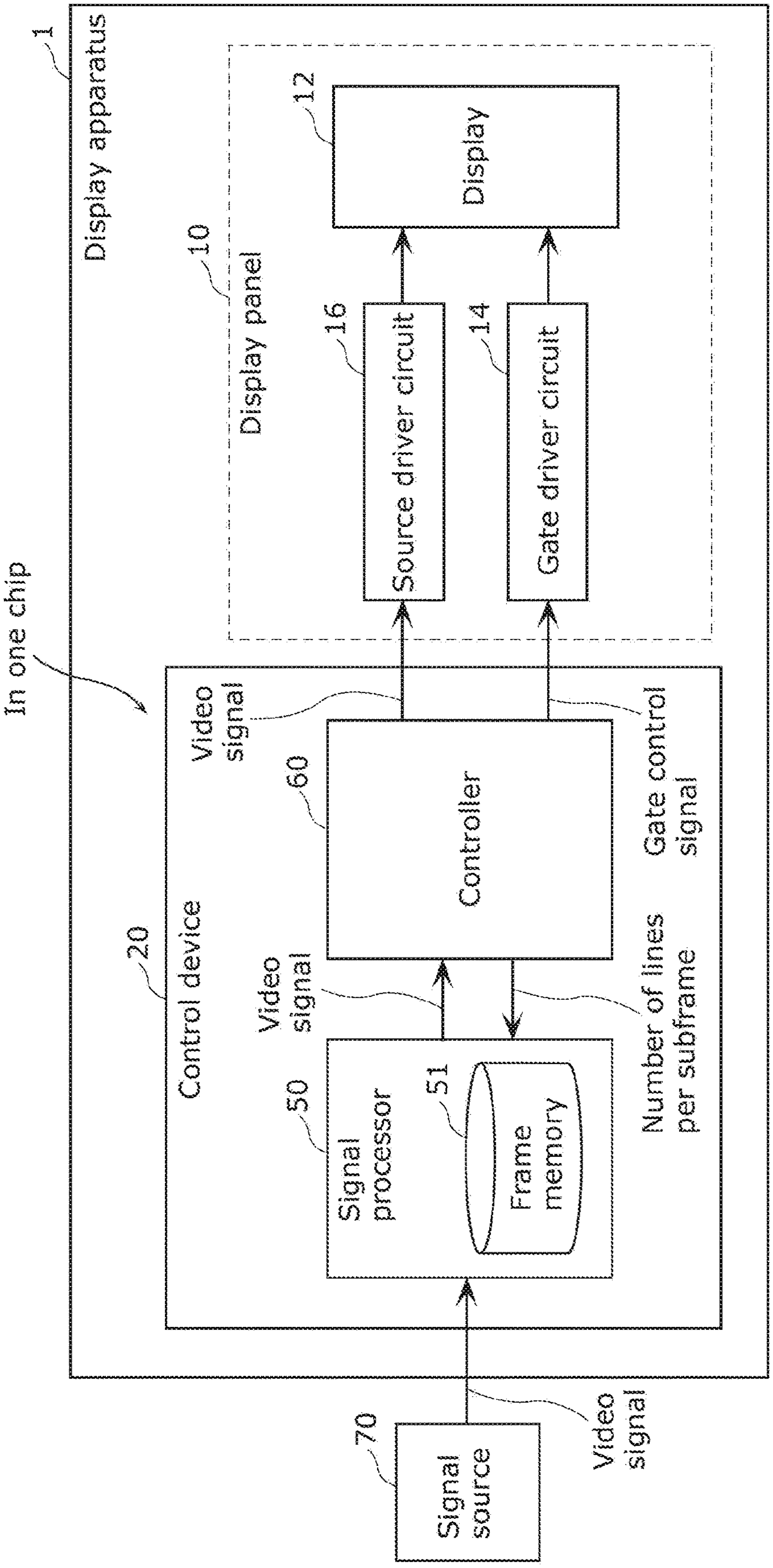
FIG. 5 is a block diagram showing another example functional configuration of the display apparatus according to the embodiment.

Note that the configuration of control device 20 is not limited to what is shown in FIG. 3. FIG. 5 is a block diagram showing another example functional configuration of display apparatus 1 according to this embodiment.

As shown in FIG. 5, signal processor 50 and controller 60 may be included in one chip. That is, signal processor 50 and controller 60 may be included in an IC chip. In this case, the information on the number of lines per subframe stored in a storage device inside control device 20 is distributed in control device 20, which allows signal processor 50 to obtain the information.

As described above, control device 20 functions as a TCON, for example, and further has the function of signal processor 50 which is built therein.

2. Operation of Control Device

Figure 6:
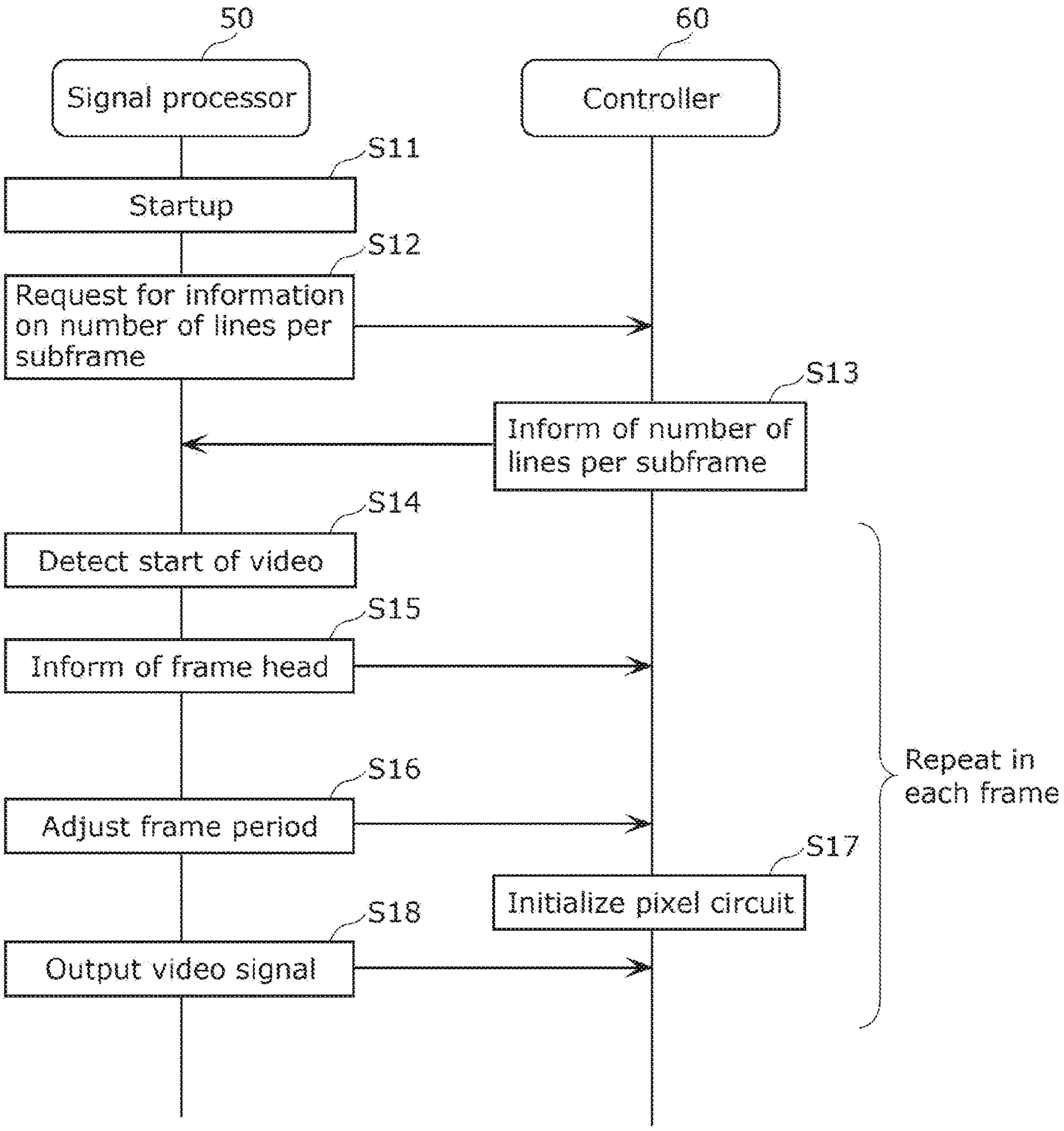
FIG. 6 is a sequence diagram showing an operation of a control device according to the embodiment.

Now, an operation of control device 20 configured as described above will be described with reference to FIGS. 6 to 10. FIG. 6 is a sequence diagram showing the operation of control device 20 according to this embodiment.

As shown in FIG. 6, signal processor 50 starts up when display apparatus 1 is powered on (S11) and then requests controller 60 for information on the number of lines of each subframe (S12). Controller 60 then informs signal processor 50 of the number of lines of each subframe (i.e., each subframe period) in response to the request (S13). It can also be said that signal processor 50 reads the number of lines per subframe from controller 60 in steps S12 and S13. Signal processor 50 can read the number of lines per subframe from controller 60, using DisplayPort Configuration Data (DPCD) address of an eDP port, for example.

Note that the processing in steps S12 and S13 may be performed only once at the first startup or every time when the settings related to the number of lines in display apparatus 1 change.

Next, upon detection of a signal indicating the start of a frame period, signal processor 50 detects the start of a video (S14) and informs controller 60 of a frame head (S15). Signal processor 50 informs of a frame starting the display of the obtained video signal. Signal processor 50 may inform of, for example, the frame next to the current frame as a frame head. In step S15, signal processor 50 informs of initialization (performing an initialization operation), for example, in the next subframe. Upon detection of a signal indicating the start of a frame period, signal processor 50 may output, to controller 60, the information on the fact that the extinction period of the subframe period next to the subframe period being executed at the time of detection includes the initialization period.

Then, signal processor 50 adjusts the frame period (S16). Signal processor 50 adjusts the frame period to execute a subframe period (initialization), which includes an initialization period in the extinction period, in a predetermined time after the detection of the signal in step S14. After adjusting the frame period in step S16, signal processor 50 informs controller 60 of the start of the next subframe.

After that, controller 60 causes an initialization operation of pixel circuits 30 (S17). It can also be said that controller 60 executes a subframe period, which includes an initialization period in the extinction period, in a predetermined time after the detection of the signal upon detection of a signal indicating the start of a frame period (i.e., upon obtainment of the notification of the start of the next subframe). A subframe period including an initialization period will also be referred to as a "subframe period (initialization)". The subframe period (initialization) is the first subframe period of a plurality of subframe periods constituting a frame period.

Note that an initialization of each pixel circuit 30 is as follows. Before storing (i.e., writing) a charge corresponding to a signal voltage in pixel capacitor 38, a reverse bias is applied to light emitting element 32 and EL capacitor 39 to perform initialization and correct (i.e., reset) the voltage between the electrodes of pixel capacitor 38 in accordance with the characteristic differences of driver transistor 33. An initialization period of each pixel circuit 30 is for applying a reverse bias to light emitting element 32 and EL capacitor 39 to perform initialization and correct (i.e., reset) the voltage between the electrodes of pixel capacitor 38 in accordance with the characteristic differences of driver transistor 33. In this embodiment, in an initialization period of each pixel circuit 30, light emitting element 32 is turned off. In other words, an initialization period of each pixel circuit 30 is included in an extinction period (also referred to as a "non-light emission period).

Next, signal processor 50 adjusts the times and outputs a video signal to controller 60 in accordance with each writing time (S18). Signal processor 50 outputs a video signal to controller 60 at each time interval of subframe periods, for example. It can also be said that signal processor 50 performs processing of converting the frame rate in accordance with the subframe periods.

Then, after initializing pixel circuit 30 in step S17, controller 60 starts writing a video signal from signal processor 50 in pixel circuit 30.

The processing in steps S14 to S18 is performed repeatedly in each frame.

Figure 7:
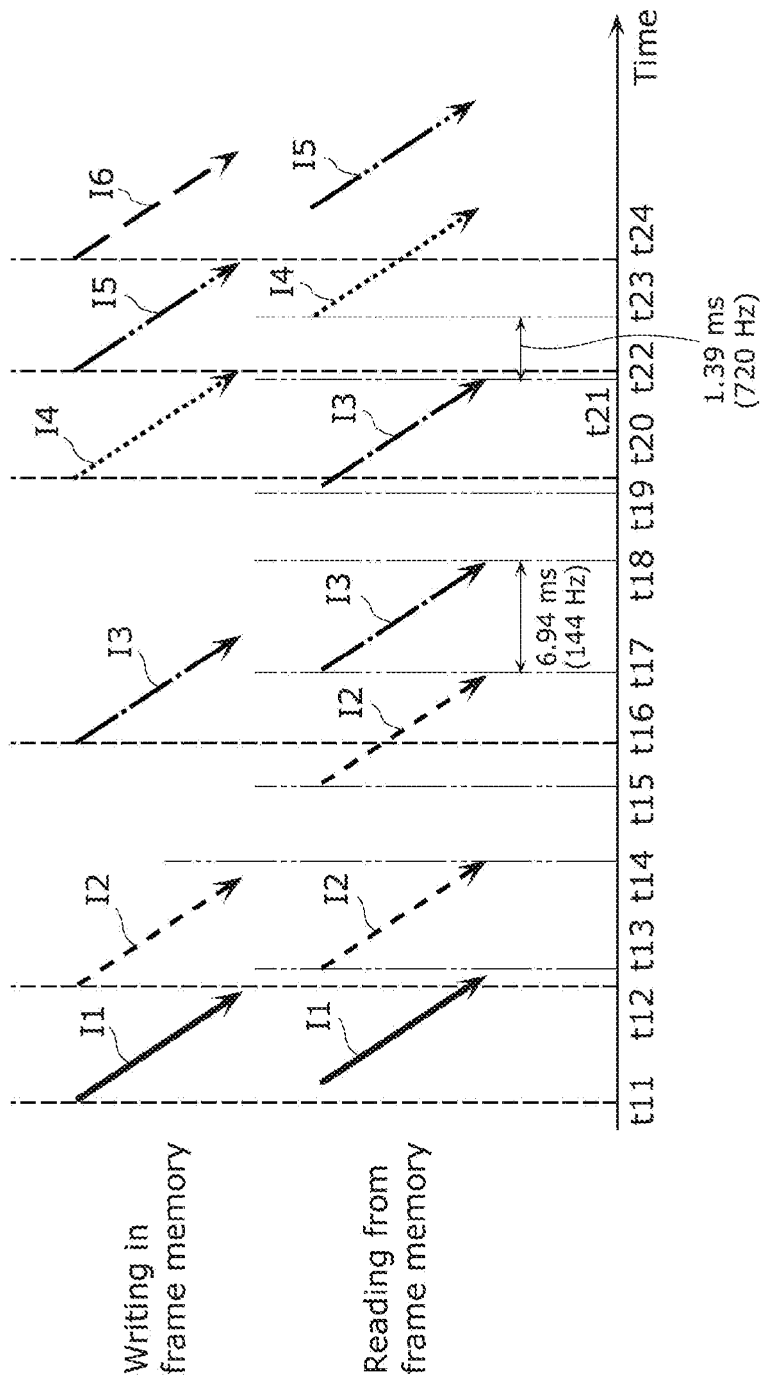
FIG. 7 is a schematic diagram illustrating times of writing and reading video signals in and from a frame memory of a signal processor according to the embodiment.

Here, input and output of video signals by signal processor 50 will be described with reference to FIG. 7. FIG. 7 is a schematic diagram illustrating times of writing and reading video signals in and from frame memory 51 of signal processor 50 according to this embodiment.

The horizontal axis of FIG. 7 represents time. In FIG. 7, the upper half of the vertical axis represents writing of video signals in frame memory 51. It can also be said that the upper half represents the times of writing the video signals from signal source 70. The lower half of the vertical axis represents reading of video signals from frame memory 51. It can also be said that the lower half represents the times of outputting the video signals to controller 60. FIG. 7 also shows times of inputting and outputting video signals I1 to I6 for six frames in and from frame memory 51.

A case is shown in FIG. 7 where one frame period has 144 Hz, each subframe period has 720 Hz, and the subframe periods are stable. Times t11, t12, t16, t20, t22, and t24 represent start times of writing video signals I1, I2, I3, I4, I5, and I6, respectively. Times t13, t15, t17, t19, and t23 represent start times of reading video signals I2, I2, I3, I3, and I4, respectively. The period between times t17 and t18 corresponds to one frame period with 6.94 ms (144 Hz) in this embodiment. Time t14 represents the first output completion time of video signal I2. Time t17 represents the second output completion time of video signal I2. Time t18 represents the first output completion time of video signal I3. Time t21 represents the second output completion time of video signal I3. The periods between times t14 and t15, between times t18 and t19, and between times t21 and t23 correspond to subframe periods, for example, with 1.39 ms (720 Hz) in this embodiment.

As shown in FIG. 7, signal processor 50 starts writing video signal I1 in frame memory 51 at time t11 and reads video signal I1 from frame memory 51 while writing the signal. This is because a subframe period (1.39 ms (720 Hz)) has passed after the last output and a time (i.e., a predetermined time) of outputting the video signal has come while writing video signal I1 in frame memory 51. Read video signal I1 is output to controller 60. Video signal I1 is read after the start of the writing in frame memory 51 almost without delay.

Next, signal processor 50 starts writing video signal I2 in frame memory 51 at time t12 and reads video signal I2 from frame memory 51 at time t13 while writing the signal. Time t13 is predetermined (i.e., a time per subframe period). Since a subframe period has passed immediately after the completion of reading video signal I1, reading of video signal I2 starts immediately after the completion of reading video signal I1. Read video signal I2 is output to controller 60. Video signal I2 is read after the start of writing in frame memory 51 almost without delay.

At time t15, a video signal is output first after time t13. At this time, frame memory 51 stores no video signal I3 which is the frame next to video signal I2. That is, signal processor 50 obtains no video signal I3. In other words, frame memory 51 stores video signal I2.

At time t16, writing of video signal I3 in frame memory 51 starts. The output data section of video signal I2 is updated with newly obtained video signal I3. While writing video signal I3, the reading of video signal I2 ends. This means that video signal I3 becomes readable from frame memory 51. At times t17 to t18, video signal I3 is read from frame memory 51. Time t17 is predetermined (i.e., a time per subframe period).

Here, at the start of writing video signal I3 in frame memory 51, video signal I2 is read and thus video signal I3 is read with a delay for the time. Video signal I3 is read with a delay of about the half of one vertical period after the start of writing in frame memory 51, for example. The delay in reading video signal I3 is longer than those of video signals I1 and I2. Note that one vertical period corresponds to one frame period, for example.

Time t23 is predetermined (i.e., a time per subframe period). On the other hand, time t21 is not predetermined.

At time t20, writing of video signal I4 in frame memory 51 starts. The output data section of video signal I3 is updated with newly obtained video signal I4. While writing video signal I4, the reading of video signal I2 ends. This means that video signal I4 becomes readable from frame memory 51.

Next, signal processor 50 starts reading video signal I4 at time t23. Signal processor 50 controls the time of outputting video signal I4 to controller 60.

Here, at the start of writing video signal I4 in frame memory 51, video signal I3 is read and thus video signal I4 is read with a delay for the time. Video signal I4 is read with a delay of about the sum of one vertical period and one subframe period (e.g., 1.39 ms) after the start of writing in frame memory 51, for example. The delay in reading video signal I4 is longer than that of video signal I3. In this manner, the processing delays of the video signals are accumulated, which results in reading video signal I4 with a delay of about the sum of one vertical period and one subframe period.

In FIG. 7, writing of video signal I5 in frame memory 51 starts at time t22. Since video signal I4 is not output yet, video signal I4 cannot be updated with video signal I5. In one preferred embodiment, frame memory 51 may include the storage capacity for storing video signal I4 (the storage capacity for one screen) and the storage capacity for storing video signal I5 to be written at times t22 to t23. The maximum period between times t22 and t23 is a subframe period. That is, signal processor 50 outputs video signal 14 with a delay for the subframe period at the maximum while receiving video signal I5.

Accordingly, frame memory 51 has the storage capacity corresponding to the subframe period (i.e., the storage capacity corresponding to the delay) in addition to the storage capacity for one screen. In one preferred embodiment, frame memory 51 may have the storage capacity for storing video signals for, for example, one screen and the subframe period. Assume that the frame rate (e.g., 720 Hz) of the subframe period is n times the frame rate (e.g., 144 Hz) of one frame period. In this case, frame memory 51 may have the storage capacity of 1/n screens in addition to the storage capacity for one screen in one preferred embodiment. In this embodiment, since the subframe period has 720 Hz (i.e., five times of one frame), frame memory 51 has the storage capacity of ⅕ screens in addition to the storage capacity for one screen.

Accordingly, if required to output the video signals written in frame memory 51 to controller 60, control device 20 can output each written video signal in the corresponding subframe period before being deleted.

For example, if a controller controls the time of outputting a video signal to source driver circuit 16, the controller also requires a frame memory for converting the frame rate into the subframe rate. In such the control device, the signal processor and the controller each writes and reads video signals in and from the frame memory. That is, each video signal is written in the frame memories twice and read at least twice.

On the other hand, in control device 20 according to this embodiment, not controller (e.g., TCON) 60 but signal processor (e.g., scaler) 50 controls the times of outputting the video signals to source driver circuit 16 (i.e., converts the frame rate). In other words, in control device 20, signal processor 50 performs the processing of converting the frame rate into the subframe rate. Accordingly, controller 60 requires no frame memory for converting the frame rate into the subframe rate. In such control device 20, signal processor 50 only writes and reads video signals in and from frame memory 51. That is, each video signal is written in the frame memory only once and read at least once. Since writing and reading video signals in and from the frame memory cause power consumption, control device 20 causes less power consumption than in the case where the controller also controls the times of outputting video signals to source driver circuit 16 (i.e., converts the frame rate).

As described above, signal processor 50 includes frame memory 51 with the storage capacity for storing video signals for one screen and a subframe period (i.e., one subframe period). Signal processor 50 outputs, on a subframe-period-by-subframe-period basis, a video signal (i.e., an "output video signal") according to a video signal (i.e., a "first input video signal") stored in this frame memory 51.

Note that frame memory 51 not necessarily has the storage capacity for storing video signals for one screen and a subframe period (i.e., one subframe period). The storage capacity may be for storing video signals for a period longer than one screen and shorter than or equal to the sum of one screen and a subframe period (i.e., one subframe period).

Note that the operation described above allows control device 20 to read video signals at a certain time interval (i.e., interval of subframe periods), even if the video signals are written not at a certain time interval.

Figure 8:
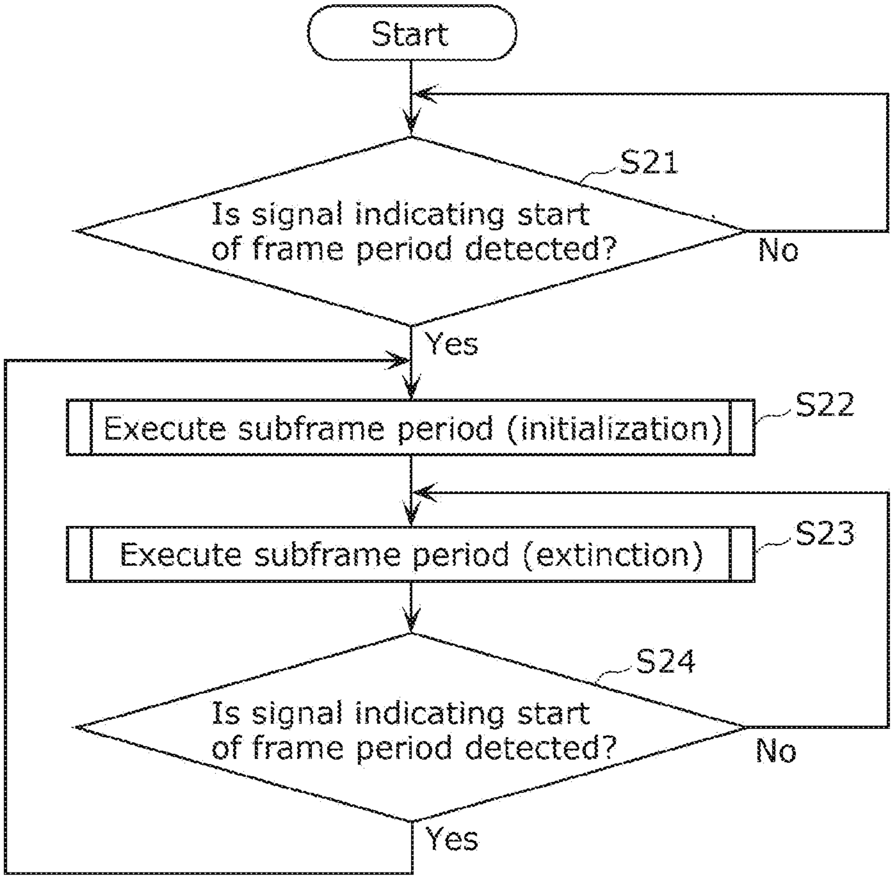
FIG. 8 is a flowchart showing an overview of an operation of controlling a light emission period and an extinction period in a frame period using the control device according to the embodiment.
Figure 9A:
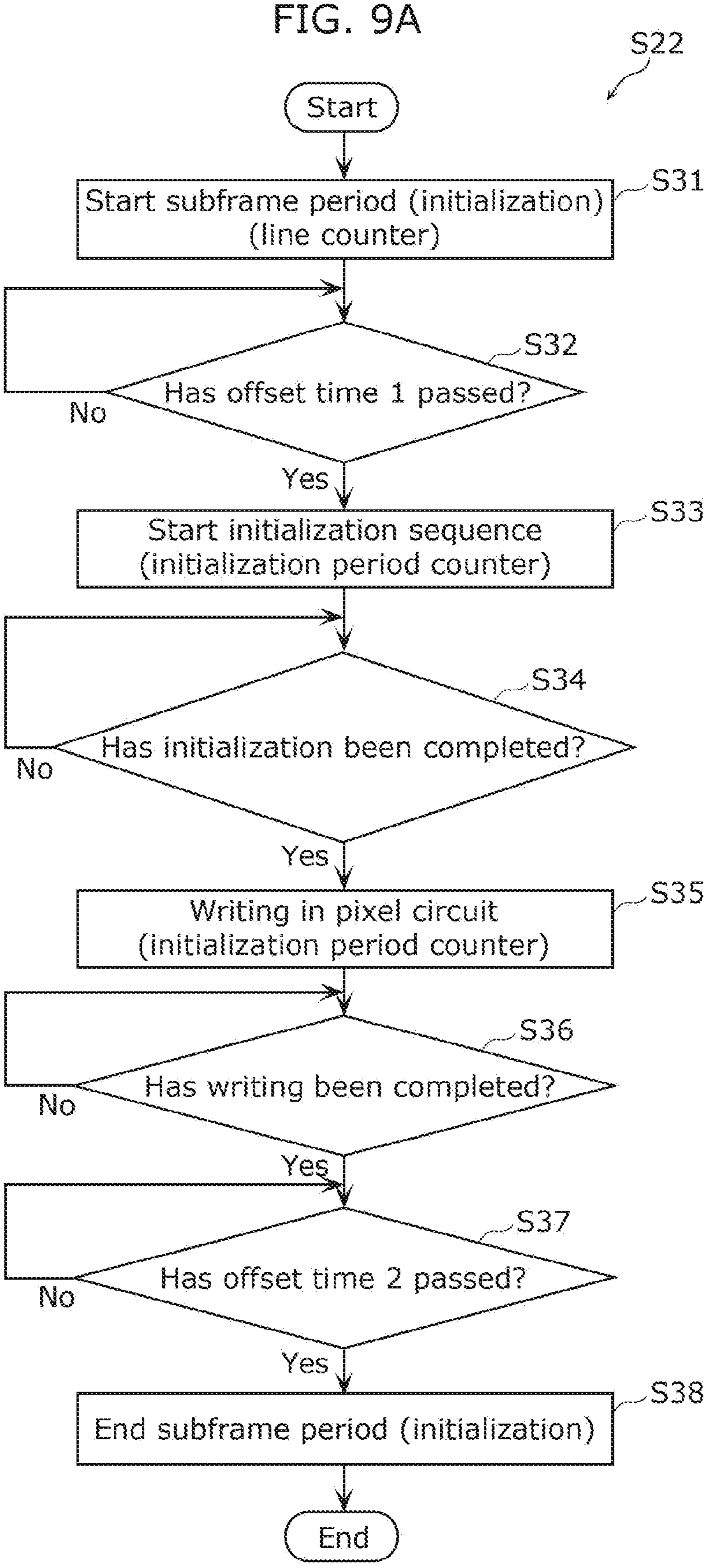
FIG. 9A is a flowchart showing a detailed operation in step S22 shown in FIG. 8.
Figure 9B:
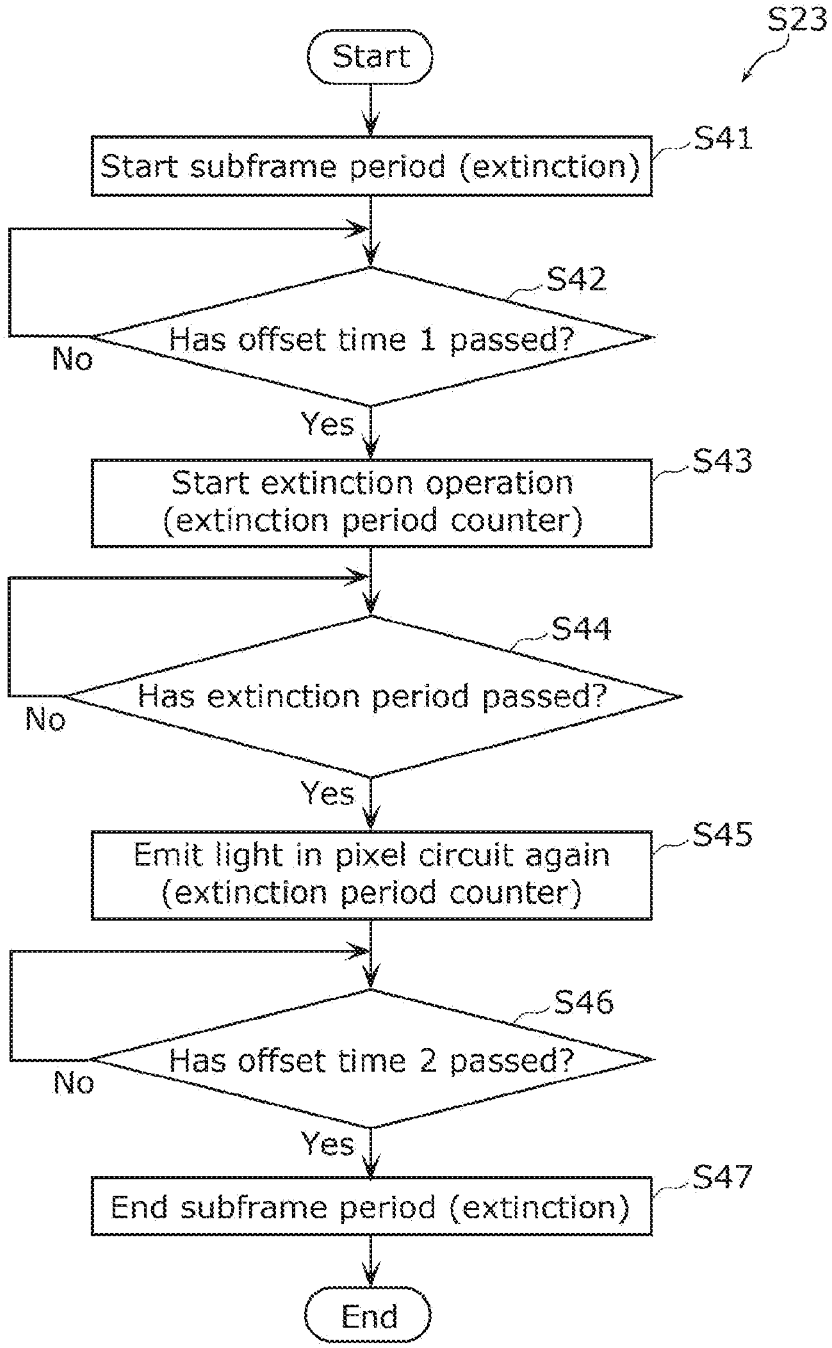
FIG. 9B is a flowchart showing a detailed operation in step S23 shown in FIG. 8.
Figure 10:
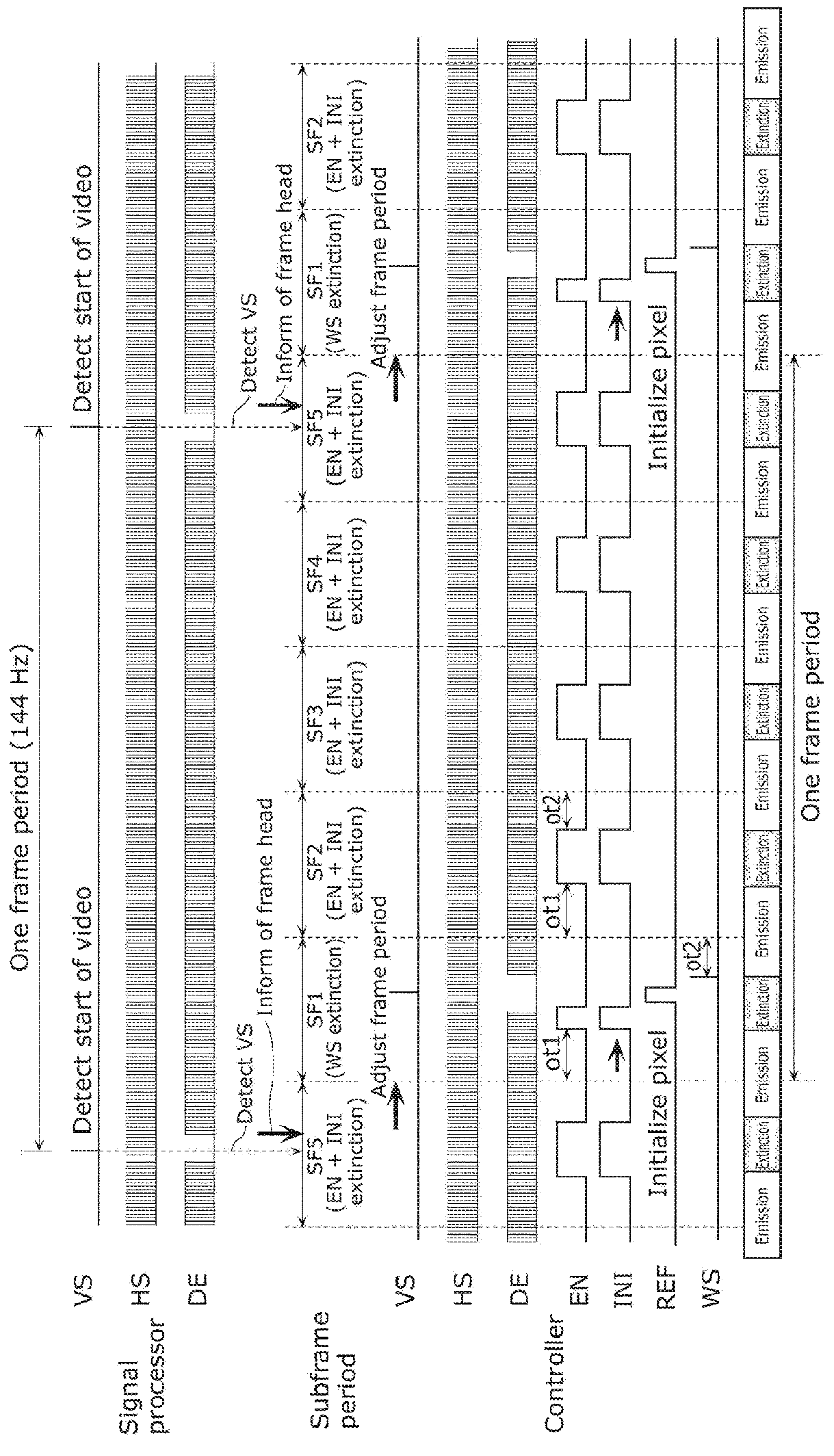
FIG. 10 shows example details of the operation of controlling the light emission and extinction periods in the frame period using the control device according to the embodiment.

Now, a detailed operation of control device 20 according to this embodiment will be described with reference to FIGS. 8 to 10. FIG. 8 is a flowchart showing an overview of an operation of controlling light emission and extinction periods of a frame period of control device 20 according to this embodiment.

As shown in FIG. 8, first, control device 20 always checks whether a signal indicating the start of a frame period is detected (S21). The signal indicating the start of a frame period is vertical synchronizing signal VS or video period signal DE. For example, signal processor 50 performs the check. Step S21 corresponds to step S14 shown in FIG. 6.

Assume that control device 20 detects a signal indicating the start of a frame period in step S21 (Yes in S21). In a predetermined time after the detection of the signal, control device 20 executes a subframe period (initialization) including an initialization period in the extinction period (S22). The subframe period (initialization) is the first subframe period of a plurality of subframe periods constituting a frame period. Step S22 corresponds to step S17 shown in FIG. 6.

Next, control device 20 executes subframe periods (extinction)(S23). The subframe periods (extinction) are those of the subframe periods constituting the frame period other than the first subframe period.

Assume that control device 20 detects a signal indicating the start of a frame period (Yes in S24) while executing the subframe periods (extinction) in step S23. The process then returns to step S22 so that control device 20 executes a subframe period (initialization) after the end of the subframe period (extinction) being executed as "after a predetermined time". On the other hand, assume that control device 20 detects no signal indicating the start of a frame period (No in S24) while executing the subframe periods (extinction). The process then returns to step S23 so that control device 20 executes a subframe period (extinction) after the end of the subframe period (extinction) being executed. For example, the determination in step S24 is made by signal processor 50.

Now, a detailed operation in executing a subframe period (initialization) and subframe periods (extinction) will be described with reference to FIGS. 9A to 10. FIG. 9A is a flowchart showing a detailed operation in step S22 shown in FIG. 8. FIG. 9B is a flowchart showing a detailed operation in step S23 shown in FIG. 8. FIG. 10 shows example details of the operation of controlling light emission and extinction periods of frame periods by control device 20 according to this embodiment. An example is shown in FIG. 10 where one frame period has 144 Hz, each subframe period has 720 Hz (i.e., 1.39 ms), and one frame period includes five subframe periods.

First, a detailed operation in step S22 shown in FIG. 9A will be described. Specifically, as shown in FIG. 9A, in step S22, controller 60 of control device 20 starts a subframe period (initialization) in a predetermined time after signal processor 50 has detected a signal indicating the start of a frame period (S31). In this embodiment, controller 60 starts the subframe period (initialization) utilizing a value counted by a line counter (not shown) of control device 20. In the example shown in FIG. 10, controller 60 starts subframe period (WS extinction) SF1 in a predetermined time after signal processor 50 has detected vertical synchronizing signal VS. Subframe period (WS extinction) SF1 corresponds to a subframe period (initialization). Note that the line counter is, for example, a timer that counts each line independently.

Next, controller 60 determines whether offset time ot1 has passed after the start of subframe period (WS extinction) SF1 (S32).

Assume that controller 60 determines in step S32 (Yes in S32) that offset time ot1 has passed after the start of the subframe period (initialization) based on a value counted by the line counter. Controller 60 then starts an initialization sequence (S33). If offset time ot1 has not passed yet (No in S32), controller 60 waits until offset time ot1 has passed.

In this embodiment, controller 60 starts the initialization sequence utilizing a value counted by an initialization period counter (not shown) of control device 20. In the example shown in FIG. 10, controller 60 starts the initialization sequence by generating a gate control signal and outputting the generated gate control signal to gate driver circuit 14 after offset time ot1 has passed in subframe period (WS extinction) SF1. The gate control signal sets extinction signal EN and control signal INI to high levels. Accordingly, controller 60 allows light emitting element 32 of each pixel circuit 30 of display panel 10 to extinguish light. Note that the initialization period counter is, for example, a timer that counts from the start to the end of the extinction period of a subframe period including an initialization period.

After that, controller 60 determines whether the initialization has been completed (S34). In this embodiment, controller 60 determines the completion of the initialization of each pixel circuit 30 utilizing a value counted by the initialization period counter. In the example shown in FIG. 10, controller 60 determines the completion of the initialization made in accordance with a value counted by the initialization period counter in subframe period (WS extinction) SF1. Note that controller 60 completes the initialization by generating a gate control signal and outputting the generated gate control signal to gate driver circuit 14 after the start of the initialization sequence. The gate control signal sets extinction signal EN and control signal INI to low levels, and sets control signal REF to a low level after setting control signal REF to a high level in a certain period.

Assume that controller 60 determines the completion of the initialization in step S34 (Yes in S34) based on a value counted by the initialization period counter. Controller 60 then starts writing in pixel circuit 30 (S35). In this embodiment, controller 60 executes the writing in pixel circuit 30 utilizing a value counted by the initialization period counter. In the example shown in FIG. 10, controller 60 generates a gate control signal in accordance with a value counted by the initialization period counter in subframe period (WS extinction) SF1. The gate control signal sets control signal WS to a high level in a certain period after setting control signal REF to a low level. Controller 60 then outputs the generated gate control signal to gate driver circuit 14 thereby starting writing.

Next, controller 60 determines whether the writing (S36) has been completed. In this embodiment, controller 60 determines the completion of writing in pixel circuit 30 utilizing a value counted by the initialization period counter. In the example shown in FIG. 10, controller 60 determines the completion of the writing in pixel circuit 30 made in accordance with a value counted by the initialization period counter in subframe period (WS extinction) SF1.

Assume that controller 60 determines, in step S36 (Yes in S36), the completion of the writing based on a value counted by the initialization period counter. Controller 60 then determines whether offset time ot2 has passed after the completion of the writing (S37).

Assume that controller 60 determines in step S37 (Yes in S37) that offset time ot2 has passed after the completion of the writing based on a value counted by the line counter. Controller 60 then ends the subframe period (initialization) (S38). That is, controller 60 ends subframe period (WS extinction) SF1 shown in FIG. 10.

If offset time ot2 has not passed yet (No in S37), controller 60 waits until offset time ot2 has passed. In this embodiment, controller 60 ends the subframe period (initialization) utilizing values counted by the line counter and the initialization period counter. In the example shown in FIG. 10, controller 60 ends subframe period (WS extinction) SF1 after offset time ot2 has passed after the completion of the writing.

Now, a detailed operation in step S23 shown in FIG. 9B will be described. Specifically, as shown in FIG. 9B, at step S23, controller 60 starts a subframe period (extinction) subsequent to a subframe period (initialization) or the previous subframe period (extinction) (S41). In this embodiment, controller 60 starts a subframe period (extinction) utilizing a value counted by the line counter. In the example shown in FIG. 10, controller 60 starts subframe period (EN+INI extinction) SF2 after the end of subframe period (WS extinction) SF1. Subframe period (EN+INI extinction) SF2 corresponds to a subframe period (extinction).

Controller 60 starts subframe period (EN+INI extinction) SF3 after the end of subframe period (EN+INI extinction) SF2. Subframe period (EN+INI extinction) SF4 and subframe period (EN+INI extinction) SF5 start similarly.

Next, controller 60 determines whether offset time ot1 has passed after the start of the subframe period (extinction) (S42). Note that offset time ot1 may be set to be the same as or different from offset time ot1 in step S32.

Assume that controller 60 determines in step S42 (Yes in S42) that offset time ot1 has passed after the start of the subframe period (extinction) based on a value counted by the line counter. Controller 60 then starts (S43) an extinction operation. If offset time ot1 has not passed yet (No in S42), controller 60 waits until offset time ot1 has passed. In this embodiment, controller 60 starts an extinction operation of pixel circuit 30 utilizing a value counted by the extinction period counter. In the example shown in FIG. 10, controller 60 starts the extinction operation (i.e., the extinction period) by generating a gate control signal and outputting the generated gate control signal to gate driver circuit 14, for example, after offset time ot1 has passed in subframe period (EN+INI extinction) SF2. The gate control signal sets extinction signal EN and control signal INI to high levels. This allows light emitting element 32 of pixel circuit 30 of display panel 10 to extinguish light.

After that, controller 60 determines whether the extinction period has passed (S44).

Assume that controller 60 determines in step S44 (Yes in S44) that the extinction period of pixel circuit 30 has completed based on a value counted by the extinction period counter. Controller 60 then causes light emitting element 32 of pixel circuit 30 to emit light again (S45).

In this embodiment, controller 60 determines that the extinction period of pixel circuit 30 has passed utilizing a value counted by the extinction period counter. In the example shown in FIG. 10, controller 60 determines the completion of the extinction period of pixel circuit 30 made in accordance with a value counted by the extinction period counter in subframe period (EN+INI extinction) SF2. Note that controller 60 completes the extinction period by generating a gate control signal and outputting the generated gate control signal to gate driver circuit 14 after the end of the extinction period. The gate control signal sets extinction signal EN and control signal INI to low levels. Accordingly, controller 60 can cause light emitting element 32 of pixel circuit 30 to emit light again. In the example shown in FIG. 10, controller 60 generates a gate control signal in accordance with a value counted by the extinction period counter and outputs the generated gate control signal to gate driver circuit 14 in subframe period (EN+INI extinction) SF2. The gate control signal sets extinction signal EN and control signal INI to low levels. Accordingly, controller 60 can complete the extinction period and cause light emitting element 32 of pixel circuit 30 to emit light again in subframe period (EN+INI extinction) SF2.

Next, controller 60 determines whether offset time ot2 has passed after the end of the extinction period (S46).

Assume that controller 60 determines in step S46 (Yes in S46) that offset time ot2 has passed after the end of the extinction period based on a value counted by the line counter. Controller 60 then ends the subframe period (extinction) (S47). If offset time ot2 has not passed yet (No in S46), controller 60 waits until offset time ot2 has passed. In this embodiment, controller 60 ends the subframe period (extinction) utilizing values counted by the line counter and the extinction period counter. In the example shown in FIG. 10, controller 60 ends subframe period (EN+INI extinction) SF2 after offset time ot2 has passed after the end of the extinction period.

An example has been described with reference to FIG. 10 where vertical synchronizing signal VS is a signal indicating the start of a frame period. The signal is not limited thereto and may be video period signal DE.

As described above, control device 20 controls at least the light emission and extinction periods of a frame period of continuing the display of an image. Control device 20 distributes (divides) the extinction periods of the frame period which includes a plurality of subframe periods of alternating light emission and extinction periods at a certain time interval. Accordingly, control device 20 executes one frame period divided into a plurality of subframe periods with a certain length to distribute the extinction periods in the frame period and to alternate light emission and extinction periods at a certain time interval.

Even if the number of vertical lines is unknown in advance and the frame period always or sometimes varies largely, control device 20 can alternate on- and off-duties with a predetermined length(s) at a certain interval of subframe periods. Accordingly, controller 60 causes less flickering observed on display panel 10, which displays an image, even with a large variation in the frame period. That is, control device 20 causes less flickering phenomenon, even with a variation in the frame period.

Assume that control device 20 detects a signal indicating the start of the frame period next to the last subframe period constituting the frame period and being executed. In this case, control device 20 starts the first subframe period of the next frame period subsequent to the last subframe period. Accordingly, controller 60 easily addresses the variation in the frame period and thus causes less flickering phenomenon, even with a variation in the frame period.

3. Advantageous Effects

Control device 20 according an aspect of the present disclosure is for display panel 10 when a frame period of continuing display of an image varies within a certain range or becomes temporarily stable in each frame but is not exactly known in advance. Control device 20 changes a total number of subframe periods to reconfigure the frame period with n subframe periods, where n is an integer of two or more, regardless of the frame period input, and causes the display of the image. Control device 20 includes signal processor 50 that outputs an output video signal according to a first input video signal on a subframe-period-by-subframe-period basis; and controller 60 that supplies the output video signal output from signal processor 50 and a control signal for controlling an operation of display panel 10 to display panel 10.

Accordingly, controller 60 requires no frame memory for converting the frame rate into the subframe rate. A video can be displayed by signal processor 50 only by writing and reading video signals in and from frame memory 51. That is, each video signal is written in the frame memory only once and read at least once. As a result, control device 20 according to this embodiment causes less power consumption for writing and reading video signals in and from the frame memory than in the case of writing and reading video signals in and from respective frame memories of signal processor 50 and controller 60.

Signal processor 50 includes frame memory 51 (an example of the "memory") with a storage capacity for storing the first input video signal for a period longer than one screen and shorter than or equal to the sum of one screen and one of the subframe periods, and outputs, on the subframe-period-by-subframe-period basis, the output video signal according to the first input video signal stored in frame memory 51.

This configuration allows signal processor 50 to output a video signal with a delay for a subframe period at the maximum. Accordingly, signal processor 50 reduces the skip of the obtained video signal and outputs the video signal more reliably.

Only signal processor 50 out of signal processor 50 and controller 60 includes frame memory 51 for storing the first input video signal.

With this configuration, controller 60 requires no frame memory, which leads to reduction in the costs for control device 20.

For example, signal processor 50 may obtain information indicating a total number of lines (i.e., an example of the "number of display lines") in each of the subframe periods of display panel 10 from controller 60, and generate the output video signal based on the information.

This configuration allows signal processor 50 to generate the video signal to be output to controller 60, that is, to be output to display panel 10 without obtaining the information from the outside of control device 20.

For example, signal processor 50 may read information indicating a total number of lines set in advance in each of the subframe periods of display panel 10, and generate the output video signal based on the read information.

This configuration allows signal processor 50 to generate the video signal to be output to controller 60, that is, to be output to display panel 10 simply by reading the information indicating the number of display lines set in advance.

Signal processor 50 and controller 60 are formed in one chip.

This configuration facilitates communications between signal processor 50 and controller 60 without any wire on a circuit board.

Controller 60 sets the n subframe periods to the same predetermined length.

With this configuration, since controller 60 causes the plurality of subframe periods to have the same length, less flickering is observed than in the case with the different lengths. That is, control device 20 causes less flickering phenomenon, even with a variation in the frame period.

Each subframe period of the n subframe periods includes a light emission period and an extinction period. Controller 60 controls a duty cycle, which is the ratio of the light emission period to the light emission period and the extinction period, to the same predetermined ratio.

This configuration allows control device 20 to alternate the light emission and extinction periods at a certain time interval, using the plurality of subframe periods. Accordingly, controller 60 causes less flickering observed on display panel 10, which displays an image, even with a large variation in the frame period. That is, control device 20 control device 20 causes less flickering phenomenon, even with a variation in the frame period.

Pixels constituting display panel 10 are each a light emitting element (e.g., an organic EL element) that emits light by a current drive.

With this configuration, control device 20 causes less flickering observed on display panel 10 employing an OLED, even with a large variation in the frame period depending on the processing capacity of the GPU. That is, control device 20 causes less flickering phenomenon on display panel 10 employing an OLED, even with a variation in the frame period.

Frame memory 51 has a storage capacity for storing the first input video signal for one screen and one of the subframe periods.

With this configuration, signal processor 50 can output a video signal with a delay for the subframe period.

Display apparatus 1 according an aspect of the present disclosure includes: control device 20 described above; and display panel 10 including gate driver circuit 14 that receives the control signal from control device 20, and source driver circuit 16 that receives the output video signal from control device 20.

This configuration achieves display apparatus 1 with less power consumption.

The control method according an aspect of the present disclosure is for display panel 10 when a frame period of continuing display of an image varies within a certain range or becomes temporarily stable in each frame but is not exactly known in advance. The control method includes: changing a total number of subframe periods to reconfigure the frame period with n subframe periods, where n is an integer of two or more, regardless of the frame period input, and displaying the image; outputting an output video signal according to an input video signal on a subframe-period-by-subframe-period basis (S18); and supplying the output video signal and a control signal for controlling an operation of display panel 10 to display panel 10 (S22, S23).

This method provides the same advantageous effects as control device 20 described above.

Variation of Embodiment

Figure 11:
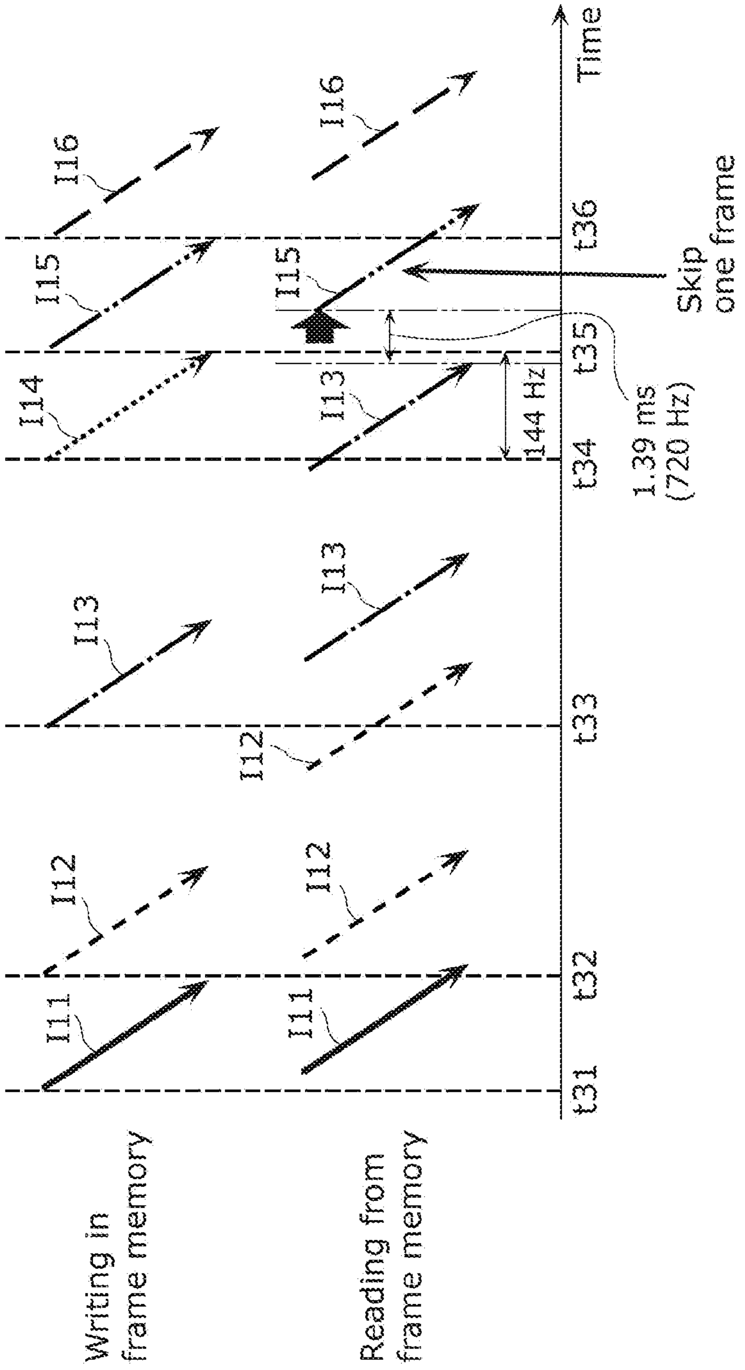
FIG. 11 is a schematic diagram illustrating times of writing and reading video signals in and from a frame memory of a signal processor according to a variation of the embodiment.

A control device according to a variation will be described below with reference to FIG. 11. FIG. 11 is a schematic diagram illustrating times of writing and reading video signals in and from frame memory 51 of signal processor 50 according to this variation. Note that differences from the embodiment will be described mainly and the same or similar characteristics as in the embodiment will be omitted or simplified. The control device has the same or similar functional configurations as in the embodiment and description thereof will thus be omitted.

The horizontal axis of FIG. 11 represents time. In FIG. 11, the upper half of the vertical axis represents writing of video signals in frame memory 51. It can also be said that the upper half represents the times of writing the video signals from signal source 70. The lower half of the vertical axis represents reading of video signals from frame memory 51. It can also be said that the lower half represents the times of outputting the video signals to controller 60. FIG. 11 also shows times of inputting and outputting video signals I11 to I16 for six frames in and from frame memory 51.

A case is shown in FIG. 11 where one frame period has 144 Hz, each subframe period has 720 Hz, and the subframe periods are stable. Times I31, I32, I33, I34, I35, and I36 represent start times of writing video signals I11, I12, I13, I14, I15, and I16, respectively. Note that the processing indicated by video signals I11 to I13 are the same as video signals I1 to I3 shown in FIG. 7.

As shown in FIG. 11, after the completion of writing video signal I14 at time I35 and before reading video signal I14, video signal I5 is written. In this embodiment, assume that video signal I15 different from video signal I14 is input before outputting a video signal according to video signal I14 stored in frame memory 51 to controller 60. Signal processor 50 then stores video signal I15 in frame memory 51 by updating video signal I14 with video signal I15. Assume that the start time of reading video signal I14 is delayed from time I35 by about one subframe period, for example, from the start time of writing video signal I14 by about the sum of one vertical period and one subframe period. Signal processor 50 then updates video signal I14 with video signal I15 without reading video signal I14. In this manner, for example, assume that the time of reading video signal I4 is delayed by one frame period or more from writing of video signal I4 in frame memory 51. Signal processor 50 then updates video signal I4 with video signal I5 next to video signal I4 without reading video signal I4. Signal processor 50 updates video signal I14 with video signal I15 even if the currently stored video signal (e.g., video signal I14) is not read until the start of receiving the next video signal (e.g., video signal I15). It can also be said that signal processor 50 skips video signal I14 (for one frame). Frame memory 51 only needs to have the storage capacity for one screen, for example. Note that video signal I14 is an example of the "first input video signal" and video signal I15 is an example of the "second input video signal".

When the time of reading video signal I4 (i.e., an example of the "first input video signal") is delayed by one frame period or more from writing of video signal I4 in frame memory 51 (i.e., an example of the "memory"), signal processor 50 of control device 20 according an aspect of the present disclosure updates video signal I4 with video signal I5 (i.e., an example of the "second input video signal") next to video signal I4 without reading video signal I4.

With this configuration, frame memory 51 of signal processor 50 requires no storage capacity corresponding to the subframe period. Frame memory 51 requires less storage capacity.

Other Embodiments

While the control device, for example, according to one or more aspects has been described above based on the embodiment and variation, the present disclosure is not limited to the embodiment and variation. The present disclosure may include forms obtained by various modifications to the foregoing embodiments that can be conceived by those skilled in the art or forms achieved by freely combining the components and functions in the foregoing embodiments without departing from the scope and spirit of the present disclosure.

For example, an example has been described above in the embodiment and variation, the signal processor includes a frame memory of a 1W1R type. Alternatively, the memory may be of 1WR type with two writing and reading ports shared.

An example has been described above in the embodiment and variation, the pixels constituting the display panel, which displays an image, are organic EL elements. Alternatively, the pixels may be liquid crystal elements. In this case, each light emission period is the period of turning a backlight on by backlight scanning, while each extinction period is the period of turning the backlight off.

With this configuration, less flickering is observed on the liquid crystal display panel in the control device, even with a large variation in the frame period in the backlight scanning. That is, the control device causes less flickering phenomenon on the display panel, even with a variation in the frame period in the backlight scanning.

The controller according to the embodiment and variation described above may include a memory for fulfilling a function other than delaying a video signal.

An example has been described above in the embodiment and variation, a video signal obtained later is stored (i.e., used for updating) first. Alternatively, the order is not limited to. A video signal previously stored but not yet output may be stored first. For example, if a previously obtained and stored video signal is not output yet, a video signal obtained later may be discarded without being stored.

The constituent elements in the embodiment and variation described above may be implemented by dedicated hardware or by executing software programs suitable for the constituent elements. The constituent elements may be implemented by a program executor, such as a central processing unit (CPU) or a processor, that reads software programs stored in a recording medium, such as a hard disk or a semiconductor memory, and executes the read programs.

The order of executing the steps in the flowcharts are mere specific illustrations of the present disclosure and may be other than what have been described above. Some of the steps may be executed with another step at the same time (in parallel) or are not necessarily executed.

The divisions of the functional blocks in the block diagrams are mere examples. A plurality of functional blocks may be implemented as one functional block. One functional block may be divided into a plurality of functional blocks. Some functional blocks may be moved to another functional block. A plurality of functional blocks with similar functions may be processed by single hardware or software in parallel or in a time-sharing manner.

The control device according to the embodiment and variation described above may be a single device or may be implemented by a plurality of devices (e.g., the signal processor and the controller). If the control device is implemented by a plurality of devices, how the plurality of devices communicate with each other is not particularly limited.

The components of the control device described above in the embodiment and variation may be implemented as software and typically as an integrated circuit, a large-scale integration (LSI) circuit. These may be included in respective chips or some or all of them may be included in one chip. While the system LSI circuit is named here, the integrated circuit may be referred to an IC, an LSI circuit, a super LSI circuit, or an ultra-LSI circuit depending on the degree of integration. The circuit integration is not limited to the LSI. The components may be dedicated circuits or general-purpose processors. A field programmable gate array (FPGA) programmable after the manufacture of an LSI circuit or a reconfigurable processor capable of reconfiguring the connections and settings of circuit cells inside an LSI may be employed. Appearing as an alternative circuit integration technology to the LSI, another technology that progresses or deprives from the semiconductor technology may be employed for integration of the components.

The system LSI circuit is a super multifunctional LSI circuit manufactured by integrating a plurality of processors on one chip, and specifically is a computer system including a microprocessor, a read-only memory (ROM), and a random-access memory (RAM), for example. The ROM stores computer programs. The microprocessor operates in accordance with the computer programs so that the system LSI circuit fulfills its functions.

An aspect of the present disclosure may be directed to a computer program for causing a computer to execute the steps of the control method shown in FIGS. 6 and 8 to 9B.

For example, the program may be executed by a computer. An aspect of the present disclosure may be directed to a non-transitory computer-readable recording medium storing such a program. For example, such a program may be stored in a storage medium and distributed. For example, the distributed program is installed in a device including another processer and executed by the processor so that the device performs the processing described above.

These general and specific aspects of the present disclosure may be implemented using a system, a method, an integrated circuit, a computer program, or a non-transitory computer-readable recording medium, such as a CD-ROM, or any combination of systems, methods, integrated circuits, computer programs, or recording media. The programs may be stored in a storage medium in advance or supplied to a storage medium via a wide-area network including the Internet.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is useful in the technical field of a display or any other suitable element of a television system, a game console, and a personal computer requiring a high-speed, high-resolution display.

The invention claimed is:

1. A control device for use in a case where frame periods, each being a period in which one image continues to be displayed, vary in length within a given range or temporarily become stable in length on a frame-by-frame basis, and accurate lengths of the frame periods are not known beforehand, the control device changing a total number of subframe periods to reconfigure the frame period with n subframe periods, where n is an integer of two or more, regardless of the frame period input, and causing the display of the image, the control device comprising:

a signal processor that outputs an output video signal according to a first input video signal on a subframe-period-by-subframe-period basis; and a controller that supplies the output video signal output from the signal processor and a control signal for controlling an operation of the display panel to the display panel, wherein each of the n subframe periods has a same predetermined length and a same predetermined duty cycle.

2. The control device according to claim 1, wherein the signal processor includes a memory with a storage capacity for storing the first input video signal for a period longer than one screen and shorter than or equal to a sum of one screen and one of the subframe periods, and outputs, on the subframe-period-by-subframe-period basis, the output video signal according to the first input video signal stored in the memory.

3. The control device according to claim 2, wherein when a time of reading the first input video signal is delayed by one frame period or more from writing of the first input video signal in the memory, the signal processor updates the first input video signal with a second input video signal next to the first input video signal without reading the first input video signal.

4. The control device according to claim 2, wherein only the signal processor out of the signal processor and the controller includes the memory for storing the first input video signal.

5. The control device according to claim 2, wherein the memory has the storage capacity for storing the first input video signal for one screen and one of the subframe periods.

6. The control device according to claim 1, wherein the signal processor obtains information indicating a total number of display lines in each of the subframe periods of the display panel from the controller, and generates the output video signal based on the information.

7. The control device according to claim 1, wherein the signal processor reads information indicating a total number of display lines set in advance in each of the subframe periods of the display panel, and generates the output video signal based on the information read.

8. The control device according to claim 1, wherein the signal processor and the controller are formed in one chip.

9. The control device according to claim 1, wherein the controller sets the n subframe periods to a same predetermined length.

10. The control device according to claim 1, wherein each of the n subframe periods includes a light emission period and an extinction period, and the predetermined duty cycle is a ratio of the light emission period to the light emission period and the extinction period.

11. The control device according to claim 1, wherein pixels constituting the display panel are each a light emitting element that emits light by a current drive.

12. A display apparatus comprising:

the control device according to claim 1; and the display panel including a gate driver circuit that receives the control signal from the control device, and a source driver circuit that receives the output video signal from the control device.

13. The control device according to claim 1, wherein each of the n subframe periods includes a light emission period and an extinction period.

14. The control device according to claim 13, wherein a ratio of the light emission period to the extinction period is a same predetermined ratio for each of the n subframe periods.

15. A control method for use in a case where frame periods, each being a period in which one image continues to be displayed, vary in length within a given range or temporarily become stable in length on a frame-by-frame basis, and accurate lengths of the frame periods are not known beforehand, the control method comprising:

changing a total number of subframe periods to reconfigure the frame period with n subframe periods, where n is an integer of two or more, regardless of the frame period input, and displaying the image; outputting an output video signal according to an input video signal on a subframe-period-by-subframe-period basis; and supplying the output video signal and a control signal for controlling an operation of the display panel to the display panel, wherein each of the n subframe periods has a same predetermined length and a same predetermined duty cycle.

* * * * *